United States Patent [19]

Hayashi et al.

[11] 4,290,996
[45] Sep. 22, 1981

[54] METHOD FOR INITIATING BIAXIAL STRETCHING OF PLASTIC TUBES AND APPARATUS THEREFOR

[75] Inventors: Kohtaro Hayashi, Chibaken; Ko Morihara, Chibashi; Kohji Nakamura, Chibaken, all of Japan

[73] Assignee: Chisso Engineering Co.Ltd., Tokyo, Japan

[21] Appl. No.: 115,018

[22] Filed: Jan. 24, 1980

[30] Foreign Application Priority Data

Jan. 27, 1979 [JP] Japan .................................... 54-8368

[51] Int. Cl.³ .............................................. B29D 7/24
[52] U.S. Cl. ................................ 264/564; 425/326.1; 425/387.1
[58] Field of Search ............... 264/563, 564, 565, 566, 264/567, 290.2; 425/72 R, 326.1, 392, 387.1

[56] References Cited

U.S. PATENT DOCUMENTS 2,744,336  5/1956  Milne .................................. 264/564
3,608,019  9/1971  Sato et al. ........................... 264/565
3,853,448  12/1974  Yazawa ............................. 425/326.1
3,960,997  6/1976  Sorensen ............................ 264/566

FOREIGN PATENT DOCUMENTS 44-20876  9/1969  Japan .
49-1316   1/1974  Japan .

Primary Examiner—Jeffery R. Thurlow
Attorney, Agent, or Firm—Fred Philpitt

[57] ABSTRACT

A method for rendering initiation of stretching easier in the production of biaxial stretched film of plastic tube carried out by enclosing gas in said tube and by the difference in the peripheral velocity between delivery nip rolls and take-up nip rolls is provided. This method is characterized by passing said tube between at last one pair of nipping means for enclosing gas, having therebetween a clearance adjustable in the range of 1~10 mm. The nipping means are provided before or behind said take-up nip rolls and driven at a peripheral speed same as that of said take-up nip rolls.

7 Claims, 3 Drawing Figures

METHOD FOR INITIATING BIAXIAL STRETCHING OF PLASTIC TUBES AND APPARATUS THEREFOR

BACKGROUND OF THE INVENTION

1. Field of the Invention

This invention relates to a method for rendering initiation of stretching easier in producing biaxially stretched film by enclosing gas inside a plastic tube and an apparatus used for this method.

2. Description of Prior Art

As one of methods for biaxially stretching plastic films, there have been known in general a method and apparatus therefor in which an unstretched tube (herein referred to as a raw film) is drawn out, passed through delivery nip rolls, a heating part, take-up nip rolls and after it is heated up to a suitable temperature, a pressurized gas is enclosed inside said raw film to effect inflation and at the same time, biaxial stretching is initiated by setting the roll speed of take-up nip rolls several times faster than that of delivery nip rolls. According to this method, every time when gas leakage at nip rolls or breakage due to accident occurs, stretching-initiating operations including operation for enclosing pressurized gas into a raw film must be carried out. Accordingly, it is desirable that the above-mentioned operations can be carried out easily.

Among such methods which have been known for initiation of stretching, there are the methods of Japanese Pat. publications No. 20876 of 1969 and No. 1316 of 1974, but both are not perfect in the point of handling.

According to the former method, connection of a special tube for enclosing pressurized gas with a raw film is carried out at the time of initiation of stretching, but this method requires quickness and skillfulness of operations, and is insufficient in the workability at the time of repetition required when initiation of stretching failed. According to the latter method, nip rolls having grooves are used in order to feed air into a tube. This method is effective for raw films having a width larger than a definite width, but in case of raw films having smaller width, the passage of gas at the part nipped with the above-mentioned grooved rolls is extemely bad and unstable and trouble is liable to occur at the time of initiation of stretching.

An object of the present invention is to provide a method in which the above-mentioned drawbacks of the conventional methods have been overcome and operation of initiation of stretching has been rendered easier.

Another object of the present invention is to provide an apparatus by which operation of initiation of stretching has been rendered easier without accompaniment of the drawbacks of the conventional apparatuses.

The above-mentioned objects and other advantages can be attained according to the method and apparatus of the present invention.

SUMMARY OF THE INVENTION

The gist of the present invention resides in:
In the simultaneous biaxial stretching of a plastic tube in the longitudinal and transversal directions, by passing said plastic tube between a pair or pairs of delivery nip rolls and a pair or pairs of take-up nip rolls and making use of the pressure of a gas enclosed in said tube and the difference between the velocities of both the delivery and take-up nip rolls, a method for enclosing a pressurized gas in said plastic tube between said delivery and take-up nip rolls, by extending the clearance of said take-up nip rolls constituting a pair and connecting an inlet for sending a pressurized gas with said tube at the rear part of said take-up nip rolls,
which method comprises:
passing said tube through between at least one pair of nip rolls or nip belts (hereinafter referred to as nipping means) for enclosing a pressurized gas, the clearance between which is adjustable to from 1 to 10 mm, and which are provided before or behind said take-up nip rolls and driven at the same peripheral speed as that of said take-up nip rolls;
adjusting the clearance of said nipping means for enclosing a pressurized gas to from 1 mm to 10 mm when said pressurized gas is to be enclosed; and
taking up said tube while transmitting to said tube, a revolving power of said nipping means for enclosing a pressurized gas, by way of a frictional force between said tube and said nipping means created by the inside pressure of said tube.

DETAILED DESCRIPTION OF THE INVENTION

The provision of nip rolls for taking up a raw film and for enclosing a pressurized gas therein before or behind conventional take-up rolls is similar to the above-mentioned conventional method, but in the present invention, there is no need of using grooved rolls in particular. It is possible to use common flat rolls. However, it is preferable that these nip rolls have a structure in which the clearance therebetween is not completely closed, but freely adjustable in the range of from 1 to 10 mm, and the peripheral speeds of both these special nip rolls and the conventional take-up rolls are made identical.

In initiating stretching, if gas is enclosed into a raw film, from the back side of nip rolls for enclosing a gas through a suitable connecting instrument, a folded raw film tends to deform into a cylindrical form by an inside pressure but if deformation is restricted by nip rolls having a certain clearance, a frictional force is created between the nip rolls and the surface of the raw film and thus it is possible to make the raw film travel by the revolving force of the nip rolls. As a result, due to the nip rolls having a clearance therebetween, grooved nip rolls which have heretofore been regarded as necessary, are no more necessary, and the operation of initiating stretching is now applicable to raw films having a wide range of width and/or thickness. Thus the processability of operation will be exceedingly increased.

PREFERRED EMBODIMENT OF THE PRESENT INVENTION

The present invention will be more fully illustrated referring to the accompanying drawings.

Figure 1:
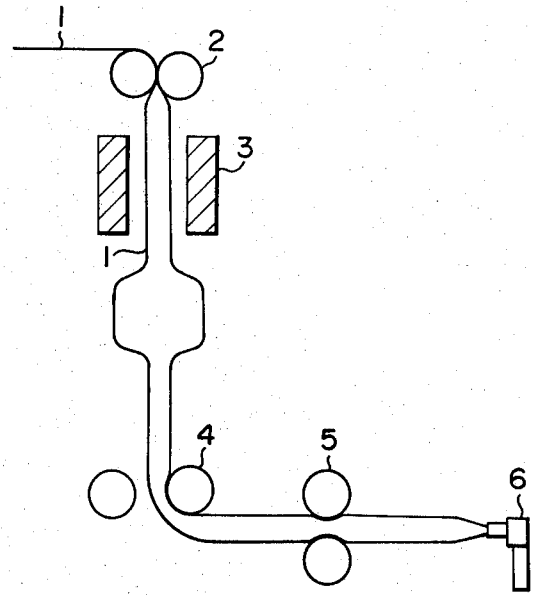
FIG. 1 is a schematic vertical sectional view of an apparatus of the present invention showing the operation for initiating stretching.
Figure 2:
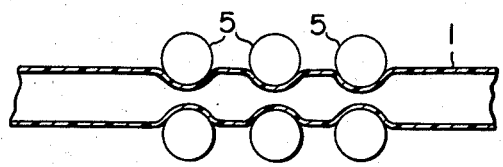
FIG. 2 is a vertical sectional view of the nipping part for enclosing a gas according to multiple nip rolls of the present invention.
Figure 3:
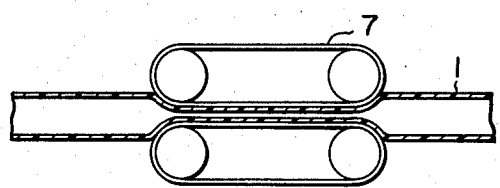
FIG. 3 is a vertical sectional view of nipping part for enclosing a gas according to nip belts of the present invention.

In FIG. 1 showing schematically an apparatus of the present invention at the time of enclosing a gas for initiating stretching, a raw film 1 is fed into a heating furnace 3 by delivery nip rolls 2 at a constant velocity, and after heated, it passes through take-up nip rolls 4 and nip rolls 5 for enclosing gas, and a pressurized gas is fed by way of a connecting instrument 6. These operations will be explained successively in order.

(1) In the preparation step, nip rolls 2 and 4 are closed and nip rolls are opened to give a definite clearance therebetween, and a raw film is travelled through a definite position. The nip rolls 4 are controlled so as to travel at a velocity slightly faster than the peripheral velocity of nip rolls 2 to impart a suitable tension to the raw film at the heating part. The peripheral velocity of nip rolls 5 is set to be identical to that of nip rolls 4.

(2) Immediately behind the nip rolls 5, the raw film is cut and connected with a connecting instrument 6 for enclosing a gas.

(3) At the same time when a valve for gas of the connecting instrument 6 is opened, take-up nip rolls 4 are opened and gas is enclosed into the stretching part. At that time, the peripheral speeds of nip rolls 4 and 5 are gradually made faster relative to the nip rolls 2 up to a definite ratio.

(4) When gas has been sufficiently enclosed, the take-up nip rolls 4 are closed and simultaneously gas enclosing is suspended.

(5) The instrument 6 for enclosing gas is removed from the raw film and the stretched film is forwarded to the next step.

In such an operation of initiating stretching, the important point is that gas is enclosed in a raw film to inflate it, and at the same time the film is stretched also in the longitudinal direction at a suitable acceleration. In the present invention, by using nip rolls 5 for enclosing gas, having a definite clearance, both the above-mentioned functions are satisfied fully. Namely, it is necessary to set the clearance of nip rolls 5 for enclosing gas, at a position where gas is sufficiently passed, and when the pressure inside the raw film is elevated, a sufficient contact pressure is caused by a force which is going to deform the raw film into a cylindrical shape. For example, as for the clearance, usually 1 mm or more are necessary, but 10 mm at the most is sufficient. If the clearance is made greater than this value, gas passage becomes easier, but, on the other hand, the contact pressure between the nip rolls and the tube is reduced and a force sufficient for taking up the raw film cannot be imparted. Adequate values for the clearance between nip rolls and the pressure of enclosed gas vary depending on the flat width, thickness and travelling velocity of raw film, the coefficient of friction of tube relative to nip rolls, etc., but if their actual values are determined in advance by tests, reproduction of the stretching-initiating operations is possible by employing the actual values obtained above.

As for the material for nip rolls 5 for enclosing gas, it is preferable to use a rubber or the like material having a large coefficient of friction. The hardness is preferably as high as possible, in order to prevent change of the peripheral velocity of rolls caused by abrasion and deformation, but if the material has a HS (rubber hardness) of 60 or more, there is no problem in practical use. HSs exceeding 90 are not preferable, since there is a fear of cracking of rubber. The HSs are preferably 85 or less.

When the take-up tension applied onto the raw film is insufficient on account of the difference in the kind of raw film or the difference in the operation conditions, the above-mentioned object can be attained by employing the nip rolls in multiple steps or by taking a structure similar to a belt conveyer, and take-up pinch rolls 4 themselves can be utilized for the same purpose if the clearance therebetween at the time of opening is limited.

What is claimed is:

1. In the method of simultaneously stretching a plastic tube in the longitudinal and transverse directions by passing said plastic tube between at least one pair of delivery nip rolls and at least one pair of take-up nip rolls and making use of the pressure of a gas enclosed in said tube and the difference between the velocities of both the delivery and take-up nip rolls, the improvement in the step of enclosing a pressurized gas in said plastic tube between said delivery and take-up nip rolls, by extending the clearance of said at least one pair of take-up nip rolls and connecting an inlet for introducing a pressurized gas with said tube, on the downstream side of said take-up nip rolls which includes passing said tube through between at least one pair of nipping means for enclosing a pressurized gas, which are provided on the upstream side and/or the downstream side of said take-up nip rolls in relation to film movement and driven at the same peripheral speed as that of said take-up nip rolls;

adjusting the clearance of said nipping means for enclosing a pressurized gas to from 1 mm to 10 mm when said pressurized gas is to be enclosed; and taking up said tube while transmitting to said tube, a revolving power of said nipping means for enclosing a pressurized gas, by way of a frictional force between said tube and said nipping means created by the inside pressure of said tube.

2. A method according to claim 1 in which said nipping means is at least one pair of rolls.

3. A method according to claim 1 in which said nipping means is at least one pair of belts.

4. In an apparatus for simultaneously stretching a plastic tube in the longitudinal and transverse directions by passing said plastic tube between at least one pair of delivery nip rolls and at least one pair of take-up nip rolls and making use of the pressure of a gas enclosed in said tube and the difference between the velocities of both said delivery and take-up nip rolls, the improvement which comprises at least one pair of nipping means, which are provided on the upstream side and/or the downstream side of said take-up nip rolls in relation to film movement and driven at the same peripheral speed as that of said take-up rolls; the clearance between said at least one pair of nipping means being adjustable within the range of 1 mm or 10 mm; and which can cause a frictional force between these nipping means and said tube capable of taking up said tube through the inner pressure of said tube, when the clearance between said take-up nip rolls is extended and a pressurized gas is enclosed in said tube between said delivery nip rolls and said take-up nip rolls, to thereby initiate stretching of said tube.

5. An apparatus according to claim 4 wherein said nipping means is at least one pair of rolls.

6. An apparatus according to claim 4 wherein said nipping means is at least one pair of belts.

7. An apparatus according to claim 4 wherein said nipping means have a surface hardness of 60–90 in terms of HS (rubber hardness).

* * * * *